(12) United States Patent
Bhat

(10) Patent No.: US 8,392,318 B2
(45) Date of Patent: Mar. 5, 2013

(54) BEEHIVE PLANET METHOD: COLLECTIVE PROPERTY BUYING AND MASS SECURITIZATION OF REAL ESTATE THROUGH A REAL ESTATE BUYER'S CLUB BROKERAGE SERVICE AND A REAL ESTATE SECURITIES EXCHANGE

(76) Inventor: Asha Subraya Bhat, Northridge, CA (US)

( * ) Notice: Subject to any disclaimer, the term of this patent is extended or adjusted under 35 U.S.C. 154(b) by 0 days.

(21) Appl. No.: 12/983,862

(22) Filed: Jan. 3, 2011

(65) Prior Publication Data
US 2011/0282774 A1    Nov. 17, 2011

Related U.S. Application Data

(60) Provisional application No. 61/345,100, filed on May 15, 2010.

(51) Int. Cl.
*G06Q 40/04* (2012.01)
(52) U.S. Cl. .......................................................... 705/37
(58) Field of Classification Search .................... 705/37
See application file for complete search history.

(56) References Cited

U.S. PATENT DOCUMENTS

| | | | |
|---|---|---|---|
| 7,130,825 | B2 | 10/2006 | Vlahoplus |
| 2005/0108136 | A1 | 5/2005 | Schneider |
| 2005/0160022 | A1 | 7/2005 | Chesney |
| 2006/0190277 | A1 | 8/2006 | Zimmerman |
| 2006/0190278 | A1 | 8/2006 | Zimmerman |
| 2008/0046353 | A1 | 2/2008 | Polotrak |
| 2008/0126235 | A1 | 5/2008 | Sullivan |
| 2009/0164360 | A1 | 6/2009 | Yoon |

OTHER PUBLICATIONS www.REIT.com, en.wikipedia.org/wiki/Real_estate_investment_trust, self knowledge on REITS.
http://homebuying.about.com/cs/condominiums/a/condo_faq.htm, www.collegehouses.org/FAQ.php, self knowledge on Real Estate Cooperatives.
www.REIT.com, en.wikipedia.org/wiki/Real_estate_investment_trust, self knowledge.
http://homebuying.about.com/cs/condominiums/a/condo_faq.htm, www.collegehouses.org/FAQ.php, self knowledge.

*Primary Examiner* — Jagdish Patel

(57) ABSTRACT

Beehive Planet Method is a computerized method spanning Real Estate and Finance fields. It creates an investment avenue for the registered investor base of a real estate brokerage through mass securitization of investment real estate into single property, no to low leverage, tradable securities created through the brokerage's services leading to a new demand based trading environment where collective purchasing creates real estate securities in primary market that trade on an inseparably linked Securities Exchange in secondary market. It uses Property Management standardization with operation and leverage classifications and exchange determined valuations and limits to convert single properties into tradable financial instruments. Complete computerization with automated property selection and collective purchasing conduct data transformation of investment criteria within buyer groups into trade transactions on an electronic exchange. Finally, it fills a void by opening up large scale investment in properties with complete investor control over choice of invested property.

16 Claims, 7 Drawing Sheets

BEEHIVE PLANET METHOD: OVERVIEW

BEEHIVE PLANET METHOD: OVERALL PROCESS

Figure 1:
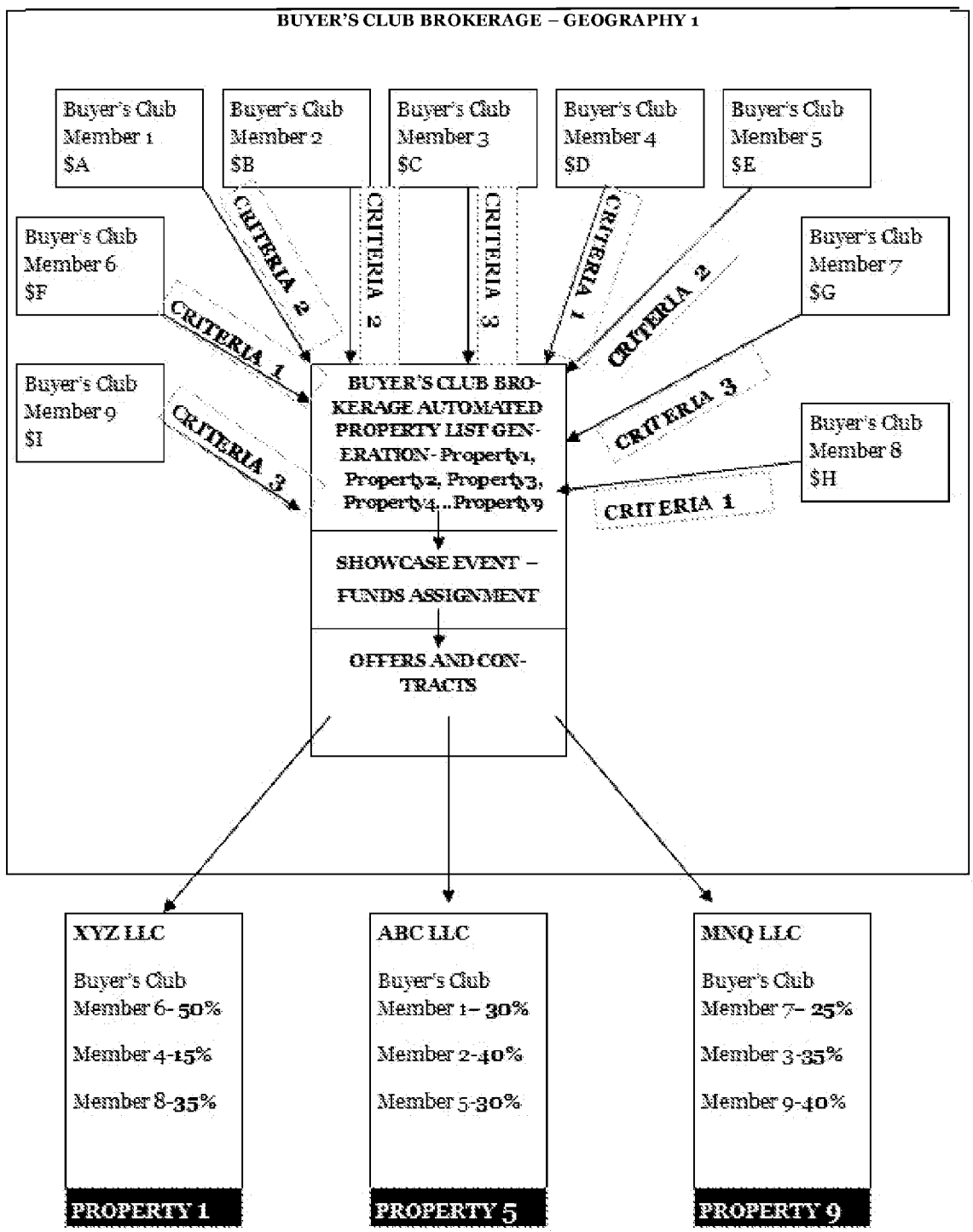

BEEHIVE PLANET METHOD: COLLECTIVE PROPERTY BUYING AND MASS SECURITIZATION OF REAL ESTATE THROUGH A REAL ESTATE BUYER'S CLUB BROKERAGE SERVICE AND A REAL ESTATE SECURITIES EXCHANGE

I. CROSS REFERENCE TO PROVISIONAL

This patent application would like to reference and take benefit of the provisional application filed with the same title on May 15, 2010 with Application No. 61/345,100

II. BACKGROUND

Real Estate Brokerages currently provide assistance in selling and purchasing of real property to individuals and to legal entities that may or may not be owned by multiple individuals. They do not necessarily target and facilitate the purchasing of a property by many buyers. There are several restrictions preventing Real Estate Brokerages from facilitating this. Agents are not allowed to earn commissions on partial purchases of property. They are required to treat all buyers the same making it unethical for them to match buyers by selecting a few from a group of interested buyers. Beehive Planet Method creates targeted services that accomplish collective purchasing by taking on co-ordination of a no. of services that buyer's would have had to organize themselves and uses the power of the computer to cut through the barriers preventing a brokerage from doing these.

In the current real estate market there is good opportunity to buy real estate as an investment. Prices are depressed, there is lot of inventory to choose from, and the economy has converted a number of home owners into renters. However these same economic factors have created a situation where this opportunity is not getting utilized by the public. Mortgages are more difficult to get. Even those that can get mortgages are averse to take the risk as the market continues to decline. The only way to buy real estate for investment without risk of foreclosure and be able to hold it till values climb back, is by cash and most people do not have cash to buy a property outright. The available way then is to buy equity REIT stocks. REIT stocks have limitations. The investor does not have control on what properties are underneath the REIT stock and the investor cannot take advantage of the deals available in the market today through these stocks. Also, REITs represent a conglomeration of properties and it is more like investing in a property management company than in the property itself.

Collective Purchasing with others where each person contributes cash that together adds up to buy one entire property in cash is a way to get around a lot of these barriers. Currently there is no good way to enable it on a large scale. A scale that is large enough so that each contributing person does not have to contribute a substantial amount. Most joint purchases today are among a few people who know each other. Also, real estate conjures up images of an investment that needs constant attention making it difficult to consider it as a financial instrument for investment. Then again, even if people got together and bought the entire standing inventory, there is the fear that they are stuck with it and will not be able to cash out if they had to.

Though securitization of real estate can happen through a public issue, most good property investments do not come out with a public issue, the small ones, more so. Once a seller goes the public issue route there is no turning back to individual buyers making it unattractive for sellers. At the same time, buyers currently prefer going to local real estate agents for purchasing real estate as they are perceived to know the local market better and have a better understanding of qualitative buyer preferences than finance professionals. However real estate brokers cannot do partial sale of real estate as that is illegal because partial sale constitutes a security.

Existing real estate securities mostly consist of REITS where investors do not have control over what their money is invested in. Moreover dependence on mortgage wipes out most of the gains that one might see in a below average rental market.

Hence there exists a need to overcome these limitations to create a robust market for real estate securities.

III. SUMMARY

Beehive Planet Method creates a systematic methodology to enable collective purchasing of real estate and invents a unique and computerized way of bundling services and handling customers to enable buying of real estate by multiple entities/individuals that may not previously be acquainted. The computer taking on distinct aspects of the process itself in addition to creating a platform for execution of the rest by providing a means for Real Estate Agents of the brokerage that signs up the buyers, Property Managers and Exchange Employees to interact and achieve results on a larger scale than would have been manually feasible.

It adds to real estate brokerage services, detailed analyzes to facilitate quick decision making and efficient coordination of activities from searching to closing and maintenance and trade afterwards, taking the hassle out of real estate investing by minimizing individual buyer involvement. It does all this through the services of a computerized Buyer's club brokerage that gets together buyers wanting to purchase collectively, finds properties for them based on their criteria and lets them decide how much they can put down on the property they like. When enough people put down money on a property to be able to buy it, the brokerage coordinates the purchase of each property into a legal entity like an LLC with each individual owning a part of it, in proportion to his/her investment. This process converts each property into a security while the property that gets securitized is chosen not by the seller of the property but by the demand for it within a group of buyers. After purchase the brokerage ensures the management and maintenance of the property through its subsidiaries/series or affiliates that have agreed to standards and rules set for managing properties, making the ownership interest in real estate hassle free akin to owning any other financial instrument.

The method provides for a real estate specific exchange that gives liquidity to the real estate securities created through collective ownership of property by making them tradable within the same investor buyer set that created it, and by enabling the formation of and trade of derivatives in the future. It facilitates the de-leveraging of real estate even on the exchange by ensuring that trades initially contribute towards the objective before derivatives are created from the securities. It links trade on the exchange to securities professionals who begin looking at and treating these securities as financial products as opposed to real estate investments in the traditional sense. This creates a whole new financial market in single property securities. The method puts in a number of requirements to create a unique financial market based on real estate deleveraging, standardized property management, demand based property selection, operation designations, automated buyer selection, exchange determined valuations and limits setting, use of one private investor group common to both primary and secondary markets, separation of listing from securitization, requirement of electronic viewing of properties before purchase or trade, elimination of occupancy rights from investments in real estate, making the computer screen and internet connection the most important requirements for purchase and trade of real estate securities and use of real estate brokerages to create in the primary market and manage in the secondary market making them an important part of an essentially financial environment.

The execution of this method adds to everything that exists in the Real Estate, Finance and Software Industries without taking anything away from these fields thereby creating much needed new jobs in the current economy. It also reduces inventory of real estate, the root cause of problems in the current economy, and gets cash flowing within it, hence reviving it. Beehive Planet Method changes consumer behavior with regards to investing in real estate in many ways. The impact can be summarized as follows:

1. Those who wish to find people to partner with for buying real estate are no longer constrained to find them in their circle of acquaintances
2. It puts the decision on what to invest in, how much and when in the control of the individual as opposed to a lending bank
3. It changes the meaning of owning a real estate portfolio from owning several properties in a single real estate entity either individually with borrowed money or partially with a fixed set of partners to owning partial interest in several properties held in separate legal entities each with a different set of partners.
4. It reduces and almost eliminates the dependence on leverage for real estate investing.
5. By simplifying the process of finding, buying and managing real estate through the buyer's club brokerage/system, it turns investing in real estate into a financial instrument.
6. It reduces the risk of buying and investing in real estate in several ways: by spreading it over several people for a particular property, by changing the mix of co-owners for every property, by eliminating the risk of foreclosure through cash buying.
7. The buyer's club exchange creates an exchange exclusively for trading in real estate securities. Once each property becomes a security, an exchange for trading in them to create liquidity becomes essential. This creates a secondary market which can lead to a number of creative financial products in the future.
8. It takes real estate investing to the masses as it cuts through the need for good credit or a large down payment and is impervious to interest rates.

As this method has evolved in concept the importance of a computerized system to execute the method has become all important and central to the successful execution of the method. Hence the detailed description of the method will first describe the method and what it aims to achieve and then focus on the computerized execution of it from the view of activities carried out on a system by all key participants in the method. Other aspects that have taken concrete shape over time is the role of the exchange in maintaining property values by taking on valuation and limits setting, classification of properties and standardization of property management within property classes to bring uniformity to valuations and along with the property managers determining the highest and best use of the property in its current market.

In view of this, the patent classification most appropriate for this type of invention was considered to be Class 705— Data Processing: Financial, Business Practice, Management, or Cost/Price determination. The process starts with investment criteria entered by a buyer who has been assigned to a group, into a real estate brokerage's database that gets converted to a tradable security of a property holding entity through collective purchase of single properties made possible by computerized processes and ends with trading of that security on a private electronic exchange linked inseparably to the real estate brokerage.

IV. DRAWING DESCRIPTION

FIG. 1: The drawing illustrates how Beehive Planet Method takes investment criteria set by buyers in a geography, and turns them into securities (LLC with members possessing varying interest) by enabling collective purchase of properties into legal entities.

Figure 2:
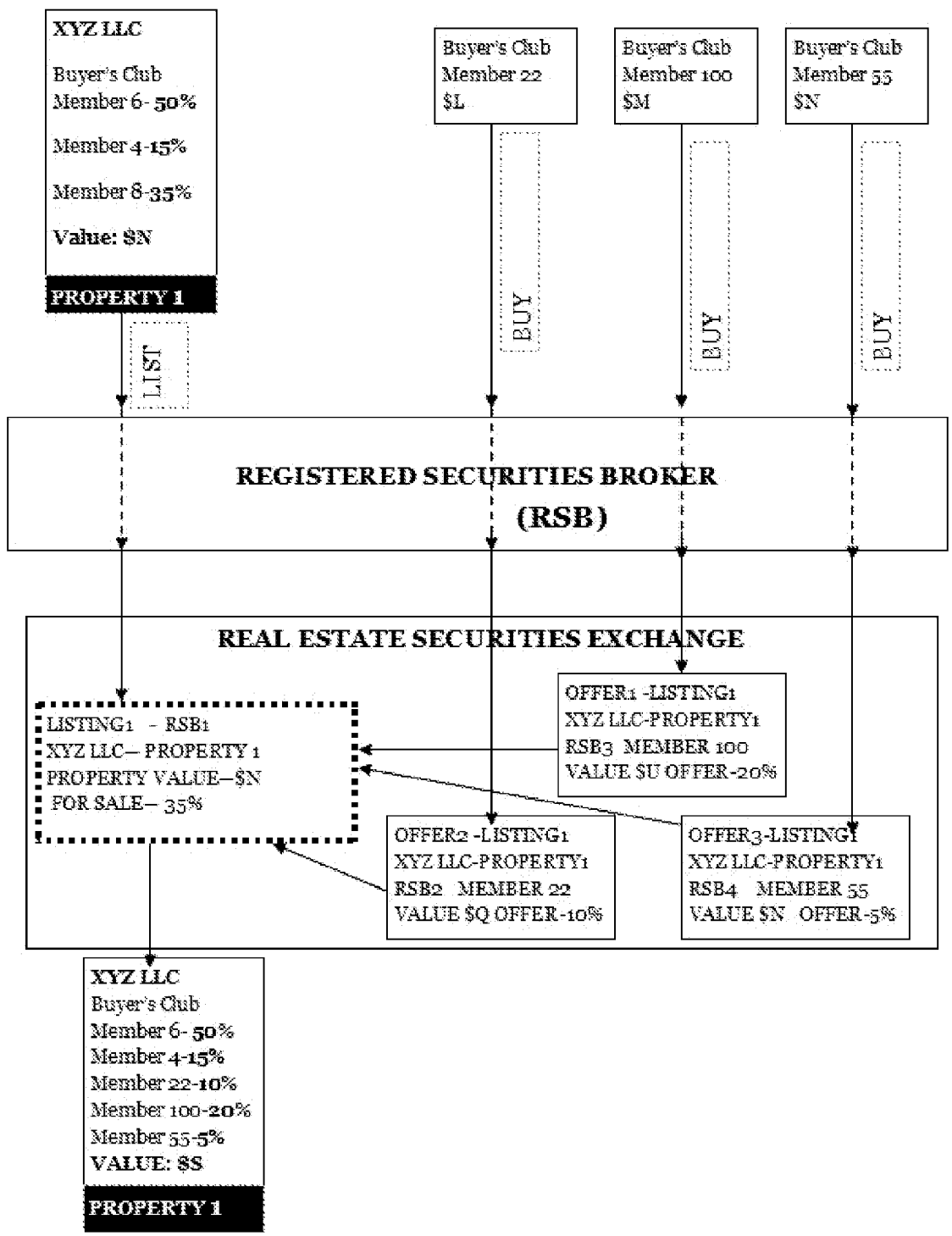

FIG. 2: The drawing illustrates one of the activities that can be carried out on the Real Estate Securities Exchange, showing members of the buyer's club listing their interest on the exchange through a registered securities broker registered with the exchange. It also shows other members making offers again through Registered Securities Brokers (RSBs) based on the interest they want to purchase and the value they want to give for it. It illustrates how the composition and values determined on the exchange might change with the acceptance of these offers.

Figure 3A:
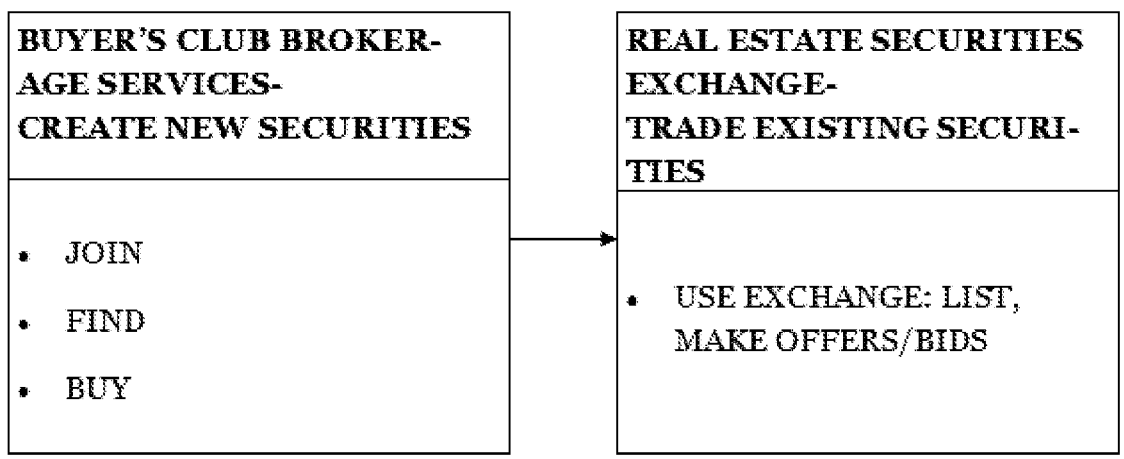

FIG. 3A: The drawing illustrates the overview of the method with its two inseparably linked key elements—Buyer's Club Brokerage and Real Estate Securities Exchange—and the role each element plays.

Figure 3B:
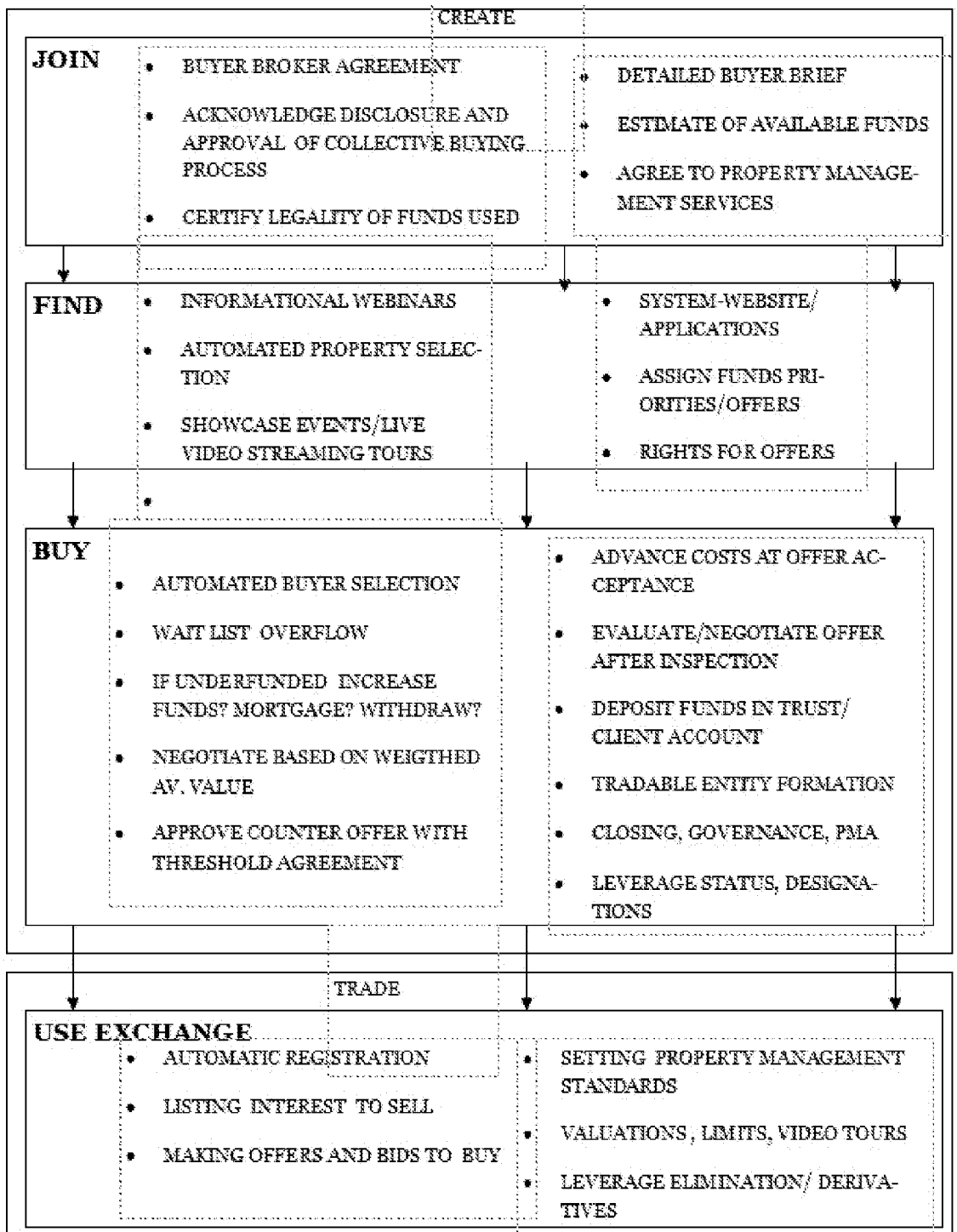

FIG. 3B: The drawing illustrates the overall—"JOIN-FIND-BUY-USE EXCHANGE" process that buyers go through securities and trade them.

Figure 4:
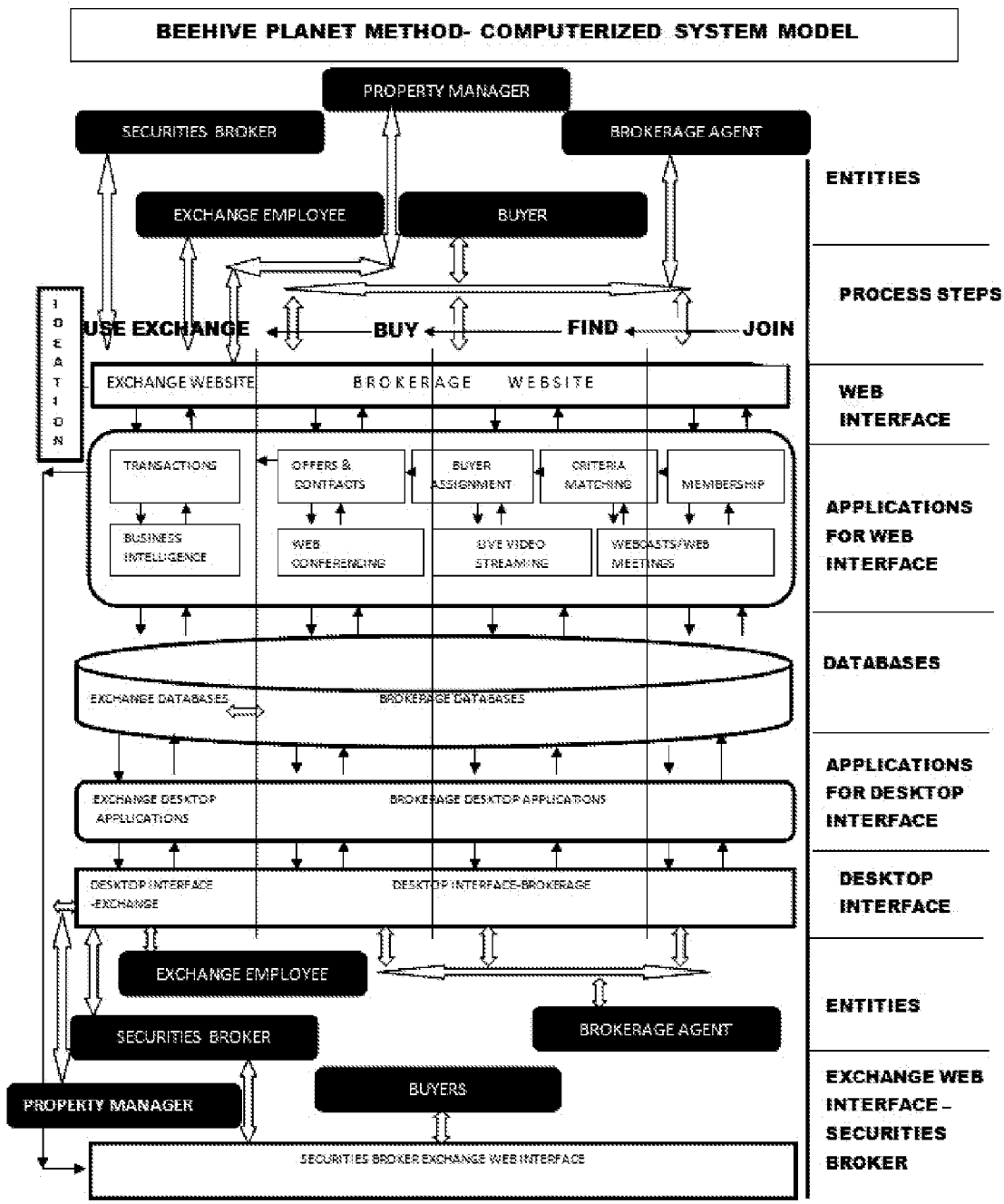

FIG. 4: The drawing illustrates the composition and architecture of the implicit computerized system within the method. It shows the websites and the applications and databases underneath as well as all the main entities that interact with the system.

Figure 5A:
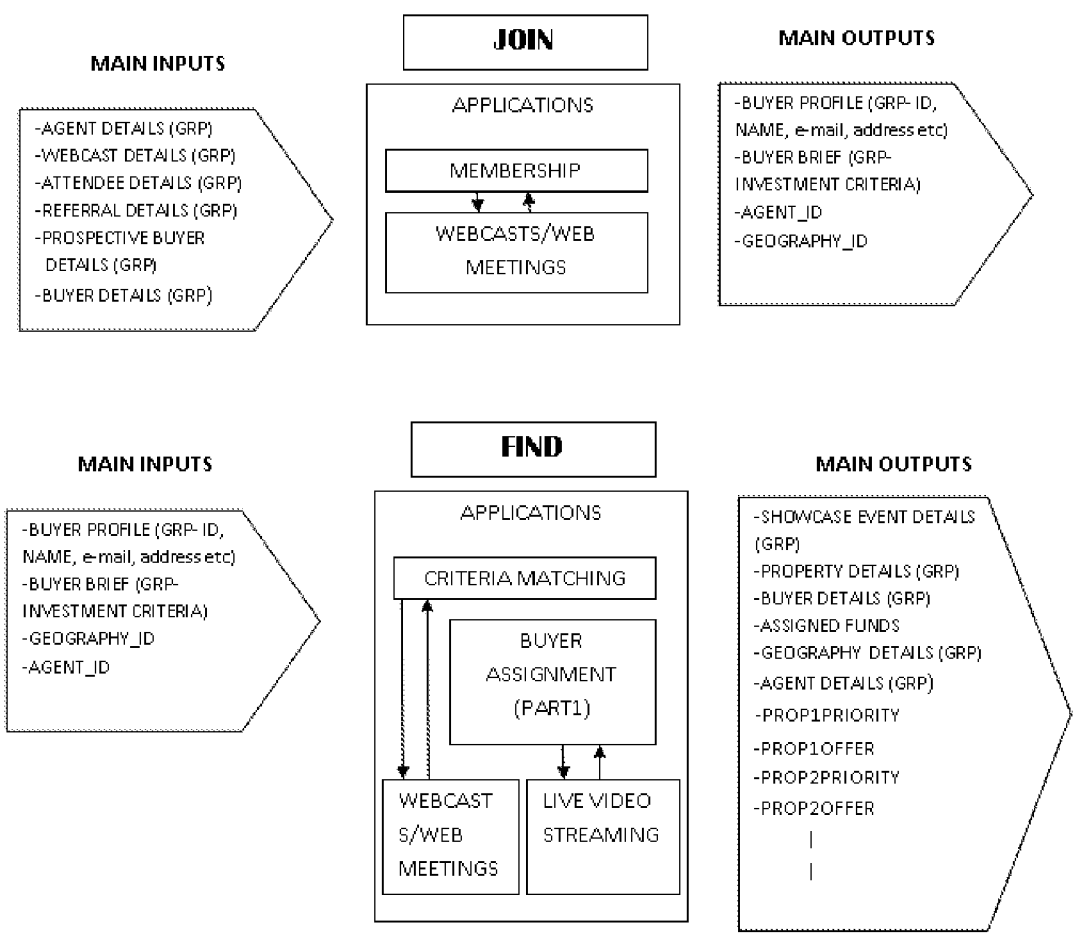
Figure 5B:
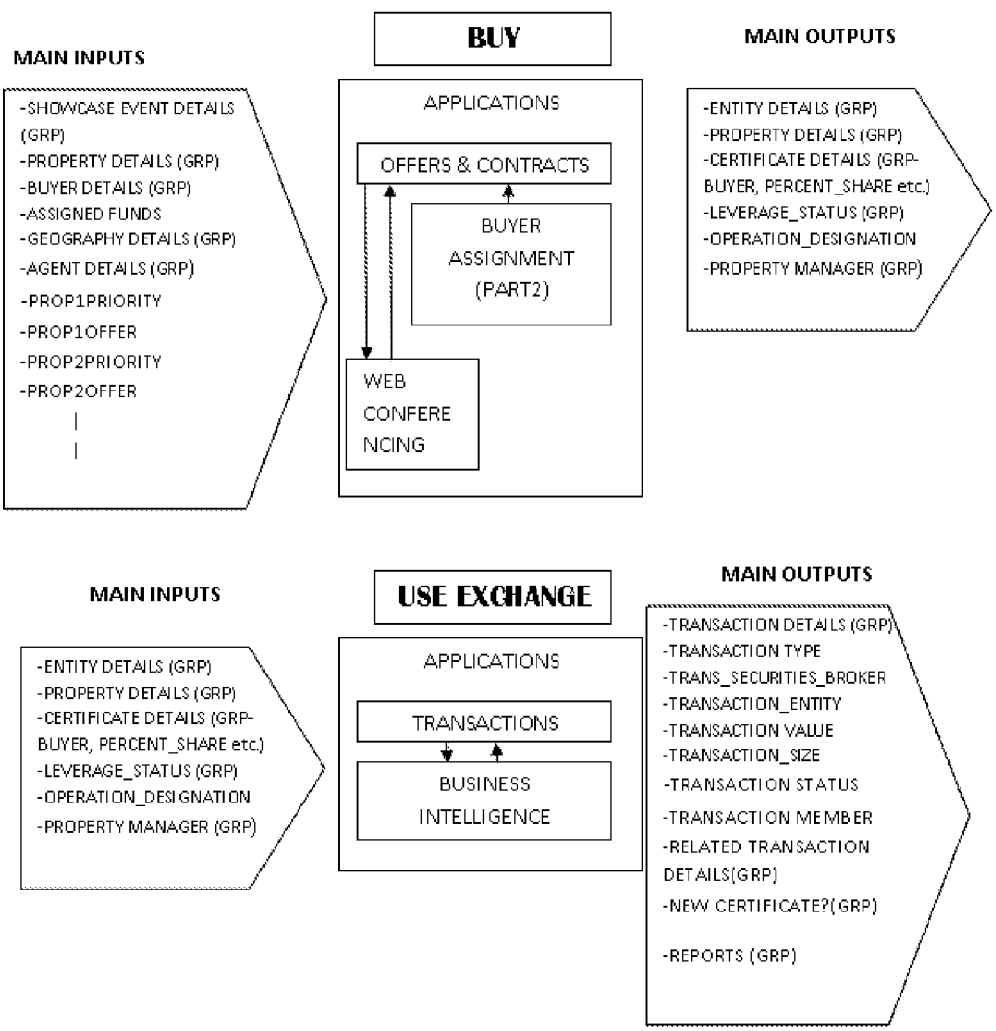

FIG. 5A: The drawing illustrates the data transformation that happens within the computerized system as the method gets executed, broken down by the steps. It shows the main inputs and outputs of each step and the applications that do the conversion. 5A is concerned with the first two steps—JOIN and FIND FIG. 5B: The drawing illustrates the data transformation that happens within the computerized system as the method gets executed, broken down by the steps. It shows the main inputs and outputs of each step and the applications that do the conversion. 5B is concerned with the last two steps—BUY and USE EXCHANGE

V. DETAILED DESCRIPTION (i) Definitions

Partial Interest: The mention of partial or fractional interest within the Beehive Planet Method and this document translates to partial interest in the property holding entity and not ownership in the property itself in any way.

Securities Brokers: The mention of Securities Brokers in Beehive Planet Method and this document refers to all professionals authorized by the law of the land to execute sale of securities including partial interest in real estate/real estate holding entities and who are registered with Beehive Planet Method Exchange to buy/sell Beehive Planet Method Securities.

Buyer's Club Brokerage: The mention of buyer's club brokerage in the method and this document refers to a Real Estate Brokerage licensed by local legal authorities to represent customers in buying/selling of real estate and authorized through a license after patent and through a contract while patent is pending to execute the brokerage aspects of Beehive Planet Method by its inventor.

Exchange: Mention of Exchange in the Beehive Planet Method and this document refers to the Exchange linked to the Buyer's Club Brokerage that is authorized through a license after patent and contract while patent is pending to execute the Exchange aspects of Beehive Planet Method. As permitted by the law of the land, the Exchange may be a subsidiary or series, affiliated organization or the same organization as Buyer's Club Brokerage.

Property Managers: Property Managers as mentioned in the Beehive Planet Method and this document are either subsidiaries, series, organizations affiliated to Buyer's Club Brokerage or individuals in authorized Property Management companies that exclusively deal with properties held by Beehive Planet Entities, and have sworn to follow standards and rules set by the Exchange that the Entities trade on.

Exchange Employees: Mention of Exchange Employees in Beehive Planet Method and this document refers to all those that work for the exchange in any capacity and perform activities assigned to the exchange in Beehive Planet Method. It encompasses employees in all departments of the exchange, subsidiaries, affiliated companies, series and independent contractors hired by the exchange.

Buyer's Club Brokerage Agent: Mention of agent or buyer's club brokerage agent in Beehive Planet Method's Buyer's Club Brokerage activities refers to licensed Real Estate Agents that are either employees and/or Independent Contractors hired by the Buyer's Club Brokerage to perform the brokerage's activities described in the method.

System: Mention of system in the Beehive Planet method and this document refers to the implicit computerized system which is a part of the Method and encompasses websites and applications, databases, processes, links and desktop tools/interfaces underneath the websites/web interfaces.

Geographies: Mention of geographies or geography in the Beehive Planet Method and this document refers to a combination of location details of buyers along with other demographics that can create viable groups of buyers for investment properties.

Assign Funds: Mention of assigning funds in the method and this document refers to bidding an amount of cash towards collective purchase of a property wherein the amount bid represents intended contribution towards purchase of the property.

Fund assignments: Mention of fund assignments in this method and this document refers to cash amounts bid by members towards collective purchase of a property wherein the amount bid represents intended contribution towards purchase of the property.

Member Investment Criteria: Mention of member investment criteria in the method and this document refers to investment criteria derived from an online brief filled out by an internet user that is a potential buyer of investment real estate and member of the real estate brokerage.

Showcase Event Mention of showcase event in the method and this document refers to a specific period of time set up for the collective purchase of investment property.

Collective purchase showcase event: Used alternatively to mean the same thing as showcase event.

Real Estate Investment Property: Mention of investment property or real estate investment property in the method and this document refers to a property bought by one or more owners for non-residential purposes with the objective of financial gain.

(ii) Method/System Description

Those skilled in the art will appreciate that the following descriptions cannot encompass all the embodiments of the method and there may be variations depending on individual circumstances while overall results achieved by the method remain the same and what is claimed exists.

(A) Two Key Inseparably Linked Elements of the Method

The two primary linked service products that this method consists of are:

1. Buyer's Club Brokerage service: A buyer's club for individuals who wish to purchase real estate with other individuals collectively, primarily with cash, as an alternative to, or as an additional avenue to, purchasing properties using leverage. This club may be a service product of a full service real estate brokerage or a separate legal entity that focuses on collective buying. Most buyers in the buyer's club will be individuals. A corporation or another legal entity other than an individual may become a member as long as it is not a real estate entity—a real estate broker or an entity that holds and manages properties for investment purposes. Regardless of whether the buyer's club member is an individual or another legal entity it will agree to the formation of a new legal entity to buy property into, when buying collectively with others, through the club. Any legal entity other than an individual will have one individual assigned to make decisions and represent the entity and that individual needs to ensure his/her availability at the time of offer negotiations. The key function of this element is to set up a process that creates tradable securities.

2. Real Estate Securities Exchange: Individuals that are members of Buyer's club Brokerage owning a partial share in real estate entities created and/or approved by Buyer's club Brokerage can list or offer their partial share for sale on the exchange, either by themselves through a Securities Broker's website or through a securities broker representing them in person. Similarly, individuals may purchase partial interest (or in other words—real estate securities) listed on the exchange or bid for that not listed, either by themselves on a Securities Broker's website or through a securities broker representing them. This exchange will be linked to the buyer's club and be provided as an additional fee based service to buyer's club members. The key function of this element is to provide for trading real estate securities, especially single property securities created by the Buyer's club Brokerage process that get registered on it automatically.

(B) Services Provided: Buyer's Club Brokerage (Including But Not Limited To)

1. Memberships to a buyer's club run by the brokerage. Brokerage may charge a fee for the membership.

2. The brokerage that runs the buyer's club which from here on may be addressed as the buyer's club brokerage becomes the exclusive buyer's broker for investment purchasing to its members for a fixed period of time.

3. Classification of buyers and their needs based on their collective real estate purchase preferences, objectives and available funds.

4. Choosing properties to present to the different classes of members based on elucidated needs with the help of computer applications and processes.

5. Quantitative and Qualitative analysis of different real estate markets and how each chosen property places within them on characteristics including but not limited to—condition, market rents, stated and estimated net income and rates of return etc.

6. In conjunction with reciprocating brokers, banks etc representing the properties for sale, holding special buyer tours exclusive to buyer's club members. These buyer tours will be a part of showcase events organized by the buyer's club brokerage for its members.

7. The buyer's club brokerage will hold showcase events electronically and/or in person, showcasing chosen properties with Live streaming video tours and all related market and property information.

8. The buyer's club brokerage will provide specific opportunity to its members to assign funds towards the purchase of a showcased property, immediately after the event for a fixed period of time. The buyers will be allowed to indicate what they think should be offered for the entire property if they do not agree with the value indicated by the CMA conducted by the brokerage.

9. The buyer's club brokerage will collate funds assignments by members to form groups of members for purchase of specific properties. This will be automated to ensure impartiality.

10. The buyer's brokerage will negotiate offers for the groups, based on available assigned funds and indicated values from buyers.

11. If offer is accepted, buyer's brokerage will coordinate legal entity formation of an LLC or another entity that allows for substitution of interest.

12. Buyer's club brokerage will coordinate all activities and move things forward towards closing, including but not limited to—property appraisal, inspection, title quality evaluations, having buyer's deposit funds in a trust/client account and negotiations with sellers based on results of these activities.

13. Buyer's club brokerage may pre-charge buyers before closing for paid services that it co-ordinates.

14. At closing the entity formed by buyer members will sign a property management contract with a Property Manager assigned by Buyer's club brokerage to manage the property and achieve set goals for the property.

15. It will provide standard entity agreement highlighting clauses that make entity interest tradable and co-ordinate formation of the same.

16. The buyer's club brokerage appointed property manager will manage and/or co-ordinate all property management activities as contracted and send timely reports.

17. The buyer's club brokerage will provide prompt communication of all its activities, obtain timely approvals for offers and counter offers, become the common resource for all buyers in the group, enable understanding of key turning points in the buying process, obtain all necessary consent and authorization to sign on behalf of the group.

(C) Services Provided: Real Estate Securities Exchange

1. All buyers' club members will be provided the option of registering for exchange services.

2. Securities brokers will be allowed to register themselves as affiliate members for a fee and a list of affiliate brokers will be available to all buyer's club brokers.

3. The exchange will provide a password protected website and a database through registered Securities Brokers to registered buyer's club members to place for sale that they own in a legal entity holding one property. The focus will be on the properties and the percent interest on sale.

4. The exchange will promote listings to buyer's club members through e-mails, newsletters, premium listings, web events.

5. The exchange will provide all registered buyer's club members opportunity to make offers on the listings either personally through a securities broker assigned website or through a registered securities broker representing them. They can also in a similar manner place bids for partial interest that is not listed for sale.

6. Offers/bids/counter-offers/acceptance are all submitted through exchange systems, that will directly communicate all information submitted without any screening.

7. The exchange will conduct periodic valuations of all entities on the exchange and set limits for trading as necessary. It will also provide through its website financial information on all its entities and set standards for uniform property management.

8. The exchange will set property management standards, classifications and other management rules for all properties held by entities trading on it.

9. The exchange will provide coordinators and analysts to aid buyers and sellers as necessary.

(D) The Beehive Planet Method: Overall Process

Join

The Buyer Process:

1. Get introduced to the Buyer's club Brokerage through its advertising activities and get assigned to an agent.

2. Sign an exclusive buyer's broker agreement for collective property purchasing with the buyer's club brokerage which lasts for a fixed period of time.

3. Receive a document elucidating the process the buyer has to go through for collective purchasing and sign an acknowledgement of being aware of and agreeing to follow the same.

4. Sign off that all funds used for collective purchasing through the buyer's club brokerage will be obtained through legal means.

5. Fill out a brief or discuss with a buyer's club brokerage agent who will fill out a brief, indicating preferences, objectives and approximate available funds for the year.

6. Agree to use Brokerage appointed Property Management services for properties bought through the buyer's club brokerage.

The Brokerage Process:

1. Use all means of advertising to attract buyers to contact the brokerage.

2. Inform and convince them to try collective property purchasing.

3. Have buyers join the club and sign an exclusive buyer's broker agreement for collective property purchasing for a fixed period of time.

4. Inform buyer's of the process they will need to go through to make everything happen smoothly and get them to agree to it and sign off on it.

5. Ensure that the club does not get misused by having buyers sign off on using legally obtained funds.

6. Have buyers fill out a brief or discuss preferences, objectives and approximate available funds for collective purchasing over the year.

7. Have buyer's agree to use Brokerage appointed Property Management services for purchases through it.

Find

The Buyer Process:

1. Attend webinars, in-office seminars, buyer tours and showcase events organized by the buyer's club brokerage.

2. When a buyer sees a property that he/she wishes to assign funds to on a showcase event, he/she signs up for the event. He/she watches the live streaming video tour of the property or the recorded video of the property and agrees to use the viewing as equivalent to a showing of the property.

He/she then indicates the amount he/she wishes to assign to the property and the offer amount for the property if different from value indicated by the buyer's club brokerage market analysis. Time is of essence as funds are assigned to properties on a first come first served manner.

3. To assign the same funds to more than one property buyer indicates all properties and the order of priority.

The Brokerage Process:

1. Conduct informational webinars to inform buyers of different neighborhoods, their merits and their potential.

2. Analyze buyer briefs to indicate areas to concentrate on for selecting properties and let a computer handle difficult aspects.

3. Look at all possible avenues for properties that present attractive investment potential and ensure that they are in the database.

4. Create a list of properties to showcase for a group of buyers. Use computer programs to help determine what properties to select.

5. Visit, take pictures, record, assess condition and rate on a set of qualitative and quantitative parameters to arrive at a market value for the property.

6. Discuss with listing brokers the fact that you will be showcasing their property and negotiate buyer tours exclusively for members. Have an independent firm do a live streaming video tour of the property and its neighborhood and post the recording in a password protected area of the website. Assign 2 days for buyer tours, so buyers can visit properties in person if they so desire in addition to electronic viewing. Have them sign off on using electronic viewing as equivalent to a showing.

7. Hold webinars and in office seminars describing showcased properties and discuss their merits, the risks involved and in general your assessment of the property. Have password protected areas on the brokerage website where buyers can access all this information.

8. Give buyers a set amount of time on a showcase event to assign funds to a property and prioritize properties if they wish to assign the same funds to multiple properties and have them indicate their assessed offer values if it is different from the brokerage market value.

9. At the time of assigning funds have them assign the brokerage, the right to sign on offers on their behalf.

Buy

The Buyer Process:

1. After the buyer's club brokerage assigns the buyer to a property and a group, buyers sign off on paperwork agreeing to allow buyer's club broker to sign on their behalf for making offers for collective purchasing of the property.

2. If sum total of assigned funds does not add up to a pre-determined cutoff amount which is seller's asking value of the property plus closing costs plus reserves, buyers need to indicate whether they wish to, increase assigned funds. If increasing funds and getting funds from buyers listed on other properties does not cover the difference but results in added funds higher than a pre-determined threshold amount for the property which is a number greater than 50% of the pre-determined cutoff amount then they can consider a mortgage. If there are enough buyers willing to get a mortgage, buyer's club broker will refer buyers to a lender for preapproval and then start negotiations and keep it going till the lower of the market analysis value and the maximum of buyer indicated offer value is reached. At the point of impasse the buyer's club broker will indicate seller's counter offer if any. If a mortgage was not needed then the collective offer price is calculated as per weighted average price of those whose added assigned funds reach or just cross the pre-determined cutoff amount.

The weights applied are calculated based on the fraction of the sum of assigned funds of those whose added funds just cross the pre-determined cutoff amount (or in the case of a mortgage fraction of sum of assigned funds of all buyers agreeing to a mortgage) that is contributed by a buyer's assigned fund.

3. Buyers need to keep communication lines open during negotiations and promptly indicate acceptance or rejection of counter offers, if any.

4. Buyers need to keep copies of all offer/counteroffer communication sent by buyer's club broker.

5. If over 60% of buyers in a group agree to a seller's counter offer, the buyer's club broker will accept it on behalf of the group.

6. Once an offer is accepted, buyers need to promptly pay the buyer's club broker as per submitted estimate towards legal entity formation, appraisal, inspection, attorney costs and any other legal or incidental costs.

7. Buyers need to promptly sign off on legal entity formation paperwork.

8. Buyers need to deposit required funds into the indicated trust/client account.

9. Buyers need to review inspection results, appraisal results and indicate any objections or desire to withdraw based on inspection quickly. No response will be taken to construe no objection to moving forward. Participate in any meetings to decide on course of action and listen to buyer's club broker's suggestions.

10. Once details are accepted and discussed and negotiated with sellers, buyers are committed.

11. If deal does not go through for any reason, the legal entity is dissolved and funds deposited are returned minus any unpaid costs.

12. If deal goes through buyers have to attend first meeting of legal entity, and sign off on property management contract and governance contract with buyer's club broker's help.

The Brokerage Process:

1. Have a computer program handle the assigning of buyers to ensure impartiality of assignments. Have the computer assign buyers on a first come first served basis without regard to amount assigned. If the response for one of the properties exceeds the listed value+closing costs+capital improvement reserves of 10-15% then move to offer negotiations on the property and start with the weighted average offer value indicated by the buyers' offers. If any of the people in the overflow after satisfying the needed number of buyers for a property has indicated second priority properties then ensure that any system, assigns them to those properties if those properties need additional buyers. Inform the remaining of the status on the remaining properties so they can indicate if they wish to be assigned to another property or kept on the waiting list for the property they had wanted. Create a waiting list for properties to account for future withdrawals.

2. If the assigned funds response to a property adds up to less than the seller's list value+10-15% reserves plus closing costs, the brokerage tries to cover the difference with increases from buyers but if not and if the total amount collected is more than a pre-determined threshold not less than 50% of the asking value plus reserves plus closing costs then brokerage evaluates if the property is a good candidate for a mortgage and if so asks the buyers if they wish to get a mortgage and how getting a mortgage will affect their investment. If the assigned funds of those willing to consider a mortgage adds up to a threshold the brokerage takes it to the next stage and has the buyers speak with a lender for preapproval as a group.

3. If the added assigned funds for a property do not come close to the mortgage threshold value even after increases from buyers then the buyers are informed that their funds cannot get them the property and offer negotiations are not started.

4. Start offer negotiations on the property at the weighted average offer level indicated by buyers. Have the computer calculate this number using market analysis value as the offer value for those that did not indicate a number.

5. Give buyers an estimate of costs they need to pay up front, if negotiations are successful.

6. Communicate counter offers from sellers and keep negotiating until the maximum indicated offer by any buyer or the market analysis value, whichever is lower, is reached. If the seller continues to counteroffer ask buyers if they wish to accept. If over 60% of the buyers indicate they want to accept then accept the offer. Communicate all offer negotiation activities to buyers.

7. Once an offer is accepted and a closing date finalized, require buyers to pay up front the legal entity formation costs, appraisal, inspection, title quality search costs and any other legal or incidental costs and give them a set time.

8. Promptly coordinate appraisal and inspection and have buyers and attorney review the purchase contract. Involve lenders as and when necessary. Disclose any referral relationships with vendors to buyers before initiating work.

9. Promptly begin the tradable legal entity formation process through a legal firm as necessary and co-ordinate signing off on documents.

10. Have buyers deposit assigned funds to the client/trust account.

11. Review inspection results, appraisal, ensure they have been sent to all buyers and indicate any recommendations on remedies to buyers. Have attorney negotiate any changes to contracts. If any buyers withdraw at this stage try to have the difference taken care of by existing buyers and/or waiting list members.

12. Once details are accepted and discussed and negotiated with sellers and funds are deposited in the trust account have a title company conduct the closing and disburse funds and get commission.

13. If deal does not go through for any reason, initiate the legal entity dissolution and return funds deposited minus any unpaid costs.

14. If deal goes through attend first meeting of legal entity, and have buyers sign off on the property management contract.

Use Exchange

The Buyer Process:

1. If buyers wish to trade in real estate interest they register for exchange services with the buyer's club. After a certain number of initial purchases in the primary market a buyer can become eligible for direct purchase on the secondary market on the exchange.

2. If buyers decide to liquidate the security they hold of the entity, now registered on the exchange as a tradable entity, they list the percent interest that they want to sell. The value they list it at is determined by the exchange and its valuation of the entire entity. They can look up the list of registered securities brokers for the exchange and either list it through their website by themselves or get the securities brokers to list it. They look at all offers received on their listing and decide if they wish to accept.

3. If they wish to buy anything listed on the exchange or post an open bid for securities of other entities on the exchange they, through a registered securities broker or through the broker's site send in offers to the listing securities broker or security holders through the exchange systems.

4. If at the time of initial securitization which happens at collective purchase, there is a mortgage on the property, with the entity having "Low Leverage" status, buyers' shares equivalent to their share of mortgage get listed on the exchange and the property manager oversees sale of these shares through securities brokers until mortgage is eliminated.

5. If the property underlying the security buyers hold is land or needs major renovations property managers resell it in the primary market with the project attached to it and buyers are notified that it is off the exchange for trading. They reapply funds to it when it is back on a showcase event to continue to hold securities of it.

6. Buyers explore the exchange website which has links to ideation website where property managers post project ideas for land development and renovations and buyers can vote on ideas on the site. There is also a link to a rental market place associated with the properties on the exchange that buyers can explore and use.

The Brokerage Process:

1. As a buyer's club brokerage Agent, make buyers joining the club aware of the fact that they can register for exchange services to buy and sell single property securities (interest in companies holding managed single properties) directly after a set minimum number of purchases through the club and that they need to associate themselves with a securities broker to be able to do so.

2. After a purchase has been made through the buyer's club converting an owned property into a single property security, agent has to ensure that entity gets properly registered on the exchange. There will be three designations of operation that will be set at the Governance Agreement signing—Maximize Profit (most income properties), Low Profit (e.g. low income housing), Loss (e.g. Land). These designations can later be changed by the Property Manager based on actual operation. Also the agent needs to ensure that the leverage level is assigned to the entity. If there is a mortgage then entity has "Low Leverage" status and if there is no mortgage then it is "Derivative Ready".

3. The exchange is a related entity to the brokerage if not legally possible for it to be the same entity. It will have employees that will control the fair use of the exchange in the trade of real estate as securities. Following steps indicate the exchange employees role in the method.

4. You (Exchange Employee) will monitor the registration of entities on the exchange and ensure that they accurately reflect the club's securitization activities.

5. You (Exchange Employee) will ensure all registered entities are current on their dues and the system accurately reflects it and sends reminder e-mails to ensure it.

6. In this method the valuation of entities registered on the exchange is done by the exchange and you will ensure that all information necessary for valuation is obtained on a periodic basis.

7. You (Exchange Employee) will set detailed standards for property management and classifications for properties.

8. You (Exchange Employee) will confer with Buyers Club Brokerage appointed, affiliated Property Managers of entities on a regular basis to ensure all objectives are being achieved, standards adhered to and post financial information for each entity.

9. You (Exchange Employee) will ensure that Independently certified video tours and property condition reports are posted on to the exchange website and are regularly updated 10. You (Exchange Employee) will ensure that exchange system is up and running 24/7.

11. The Brokerage affiliated Property Managers who also are licensed real estate agents play an important role in the method. You (Property Manager) enable the treatment of interest in the single property holding entities as a financial instrument.

12. You register yourself as a preferred Property Manager with the Exchange and create a web page on the exchange website.

13. You sign and upload or use an approved electronic signature service to enter an agreement to abide by the standards of Property Management set by the exchange for the different property classes 14. You assign an accountant to the property for periodic reports to be submitted to the exchange.

15. Determine, if assigned designation for an entity is achievable and is the best designation for the property. Change if necessary.

16. If property has a mortgage on it, put the shares up for sale on the exchange, until mortgage is paid off through trade on exchange and/or income.

17. If property is land, keep track of developments in the property location to determine the right time for development and the most profitable form of development. When the time is right, have developers present project concepts and post these concepts for vote on Ideation website of the exchange for buyer members to vote on the concepts. Based on vote results and knowledge of market, decide when the time is right, have developers present project concepts and post these concepts for vote on Ideation website of the exchange for buyer members to vote on the concepts. Based on vote results and knowledge of market, decide on the project/s to put on sale. List on MLS as land with project packet. Activate project on Ideation website for transfer to Buyer's Club Brokerage database. On activation the project gets transferred to the Buyer's Club Brokerage automatically overnight. Inform current entity security holders of impending sale of land with project. Inform them of showcase event dates so they can re-bid for the project if they wish to continue to be security holders. When project gets sold and re-registered on the exchange, co-ordinate with developer until construction is complete, property is assigned to new property class and new designation. Prepare new objectives for the entity and submit to exchange. Keep track of values and manage property according to standards set for the class.

18. If property needs major capital improvements, get bids for capital improvement projects, decide on vendor and put the project on the ideation website for feedback. Use feedback to decide the right time to list and list on the MLS as the said property class with an improvement project packet. Activate project on Ideation website for transfer to Buyer's Club Brokerage database. On activation the project gets transferred to the Buyer's Club Brokerage automatically overnight. Inform current security holders about showcase events so they can bid on it for continuing as security holders. Manage the transition, reclassify property if necessary, co-ordinate the improvements. Change all necessary details on the exchange website.

19. Post all rental activity on the public rental website of the exchange. Keep track of market rents and amenities in property location and adjust rents on the site as necessary.

20. Securities Brokers are preferred vendors, who register themselves with the Exchange as authorized to represent Buyer's Club Members for trades on the exchange. They create their profiles on the exchange website.

21. They can get a special registration allowing them to give online access to buyer's club members through their website to trade on the exchange directly.

22. Each legally authorized agent in a securities broker's office can then register themselves individually with the exchange.

23. They can register themselves as a buyer's club member in addition to being registered as a securities broker to trade for themselves.

24. They will be able to create funds and other financial derivatives but will have to market them to buyer's club members and have them listed on the exchange.

(E) Beehive Planet Method: Computerized System:

Following pages describe the interaction between all main entities and the computerized system innate to the method.

Join

Buyer Interaction With the System

1. Buyers sign up for promotional webinars on the brokerage website and attend them.

2. They access the buyer's club pages, create a buyer's club account and log into their account.

3. They join the buyer's club on the website and pay any dues online through a bank account or credit card. In the process of joining they appoint the buyer's club brokerage as their exclusive buyer's agent for real estate investment purposes for a fixed period of time.

4. They download all necessary documents from the site, sign, scan and upload them on to their account. They send/deliver originals to the brokerage. Else they use a brokerage approved electronic signature service.

5. They key in the agent they attended the webinar for or discussed joining the circle with.

6. If they got to the website through a search or through online and/or other advertising, they can request the system for an agent and the system assigns them one based on their location. They can also browse profiles and chose one.

7. They fill up the detailed online brief either themselves or through their agent to describe their goals and preferences for real estate investing. Along with the brief they agree to a number of conditions required by the brokerage which include but are not limited to (a) agreeing to the use of legally obtained cash which they have available on hand for purchases;(b) accepting to view either live streaming tour or independently certified video tour of a property before participating in collective purchase or trade of it and considering the viewing a showing by the Brokerage© confirming that he/she is not an entity or an individual involved in holding and managing real estate for investment in his/her name or do property management or real estate brokering as a profession in their own name (d) confirming that he/she does not belong to a group of people who know each other and wish to buy entire properties together.

8. Once they have completed all requirements, they receive a confirmation e-mail welcoming them to the buyer's club. They click on the link in the e-mail to activate their account for collective purchase transactions.

Brokerage Agent's Interaction With the System

1. Schedule promotional webinars/webcasts on the website and conduct them through the integrated web conferencing application on the system.

2. Have them complete an online brief, upload buyer brokerage agreement, upload agreement to use legally obtained cash, confirm knowledge of the entire process, upload consent to get purchased property professionally managed by brokerage assigned property managers and upload any other necessary documents. When the entire aforementioned are completed and buyer has activated his account, you will receive a confirmation e-mail. You review everything and approve the activation. You will ensure that brokerage remains their primary contact by making sure the system does not allow them to look up other buyers in any way.

3. Your approval of the account will trigger an application to parse the online brief into specific criteria, add them to criteria for all approved accounts in all relevant geographies that you preset in the system to update a criteria database.

Data Transformation Aspect of the System

1. While a number of data elements get created in the "JOIN" step the most important one is the Buyer Brief set of elements that lay out a buyer's needs and preferences and determine investment criteria for the buyer.

2. When the buyer enters his/her personal details he/she get assigned to various geographies created by the buyer's club brokerage agent Find Buyer Interaction With the System 1. Buyers log in to their account on the website, sign up for informational webinars and adjust online brief as their needs and preferences evolve. They activate new brief every time they change it.

2. They browse Buyer's Club Brokerage database, suggest properties, respond to e-mails from the linked exchange's Ideation website by voting on construction/improvement project concepts, keep track of and sign up for online showcase events organized by the buyer's club brokerage agent.

3. Before assigning funds in a showcase event, they download, sign, scan and upload the agreement to consider attending of a live video streaming showing of a property as an agent showing. At the same time they also sign and verify that they will only assign funds they actually have on the event and that if they get assigned to a property they will give the buyers club agent right to negotiate offers on their behalf. They send/deliver original to brokerage after the event or alternatively use a recommended electronic signing service to sign all documents 4. They attend the live online video buyer's tour or its recording for each property on the showcase event and check off on the website to indicate properties viewed. They receive an e-mail confirming them.

5. They evaluate all information presented on the website by brokerage on viewed properties, the market analysis and broker price opinion.

6. They go on the webpage of the property and assign funds against it within the time period set for it. To assign these same funds to another property (if they do not get the one they assigned funds to); they check mark the other properties and prioritize them.

7. To assign separate funds to each property, they go to the webpage for each property and assign funds to each property separately.

8. They enter their estimate of offer price for the entire property on each property they want to assign funds to, in the box provided next to the funds entry box for the property on the website. If they do not enter an offer price the broker's CMA estimate will be used as their offer price.

9. Each time they assign funds and enter offer price they get a calculated estimate of how much money they might need if they get the property. They acknowledge that they have necessary funds in cash.

10. They receive an e-mail summary of their funds assignment, offer prices and prioritization.

Brokerage Agent's Interaction With the System

1. Conduct informational webinars through the system to educate and inform buyers.

2. Monitor the changes made to the buyer briefs and acknowledge them promptly so the system can recalculate criteria and update the database.

3. Through the desktop tool create buyer groups by indicating geography and other parameters and schedule times for criteria updates and property list creation.

4. For all the broad groups created on the system, on scheduled times the computer runs the criteria matching program which determines the most important criteria for the group based on popularity within the group, then combines the results with past purchase history of members in the group to create a list of properties ordered based on likelihood of the properties being purchased by a buyer set within the group.

5. Review listings pulled by the system on a regular basis and create a showcase event based on listings pulled. Set date and time for the event on the system separating out the time for viewing and time for subsequent funds assignment.

6. Request and set dedicated times for buyer tours and live video streaming showings.

7. Set scheduled e-mails in the system to buyers reminding them to sign up for the showcase and the video streaming showings.

8. Create showcase property pages. Preview the property; add market information and your opinion on property market value. Complete and upload CMA with price opinion report.

9. Have an independent vendor do a video streaming of the properties and post recordings of it. These are done from the buyer's point of view and give a good idea of the condition and potential of the property.

10. Every time a buyer views the streaming showing/recording through the website, an e-mail is sent to the buyer, the listing agent and to you and confirms that there was a showing, confirms the buyer associated with the showing, and you as buyer's agent for it.

Data Transformation Aspect of the System

1. Buyer Brief criteria that the buyer enters in the "JOIN" step along with other briefs in a set geography become inputs to the Criteria Matching program. This program creates a list of properties that might get bought by sub groups of buyers within that geography.

2. After a showcase event is created on the system which takes the properties brought up by the Criteria Matching program as input, buyers assign funds to properties and indicate total offer amounts on properties. So, towards the end of the "FIND" part of the data transformation, what started as a buyer brief criteria set entered by the buyer gets transformed into assigned funds, property offer price and priority numbers for assigning funds, for each buyer and property on the showcase event.

3. The criteria matching program goes through a unique process of first assessing the most popular buyer brief criteria in geography, then combining it with results of models created based on past purchase criteria to generate a list of properties most likely to be bought within the geography.

Buy

Buyer Interaction With the System

1. Once the time period set for funds assignment for the showcase event expires buyers will receive e-mail notification that includes information on how much of their assigned funds were applied towards each property they assigned funds to what the calculated offer price was for each property if their funds were assigned too late for a property whether they got applied to another property based on their set priorities if they got waitlisted on any property.

2. This e-mail will also contain a link which will be usable for a set number of hours after expiration of funds assignment time period when they can go and remove themselves from any wait lists or reassign/increase funds on their and other properties.

3. The link takes them to a status page where they can see properties that need additional funds to be sold. These properties will be bucketed based on what percent of the asking list value plus reserves plus closing costs the total of the assigned funds add up to. Any property with less than a threshold percent of assigned funds, the threshold being a number more than half the seller's asking value plus reserves plus closing costs in assigned funds, will not eventually be sold. They can choose to increase funds on the properties that they previously assigned funds to that need funds or if waitlisted assign funds to another property needing funds.

4. After the set time period, they will receive another status e-mail with link to see the results of their re-assignment/ increase of funds. If they get assigned to any property or accept being wait-listed on any property they will ensure that they have signed a document agreeing to give the buyer's club agent right to negotiate offers on their behalf and agree to make themselves available for any voting required during the time period.

5. After the re-assignment round, if there are properties going to the offer stage the weighted average offer calculated by the system with their adjusted funds amount is emailed to them. If any property they assigned funds to has a small enough gap between the total assigned funds and the asking value+10% reserve plus closing costs mark that a mortgage might be a viable option, the system will suggest the buyer's club agent to activate a vote to determine interest among buyers to do the same. The agent will consider income generated by the property as a key indicator to decide activation. All buyers that assigned funds to such a property will receive an e-mail with a link to a voting page.

6. If enough buyers agree to a mortgage, to still keep it viable, buyers will receive an e-mail with a mortgage broker's name and address to approach to get pre approved within a set period of time.

7. Buyers receive an e-mail linking to Mortgage Broker's assessment of the buyers as a group and the Brokerage agent's recommendation based on property features. Buyers vote online to start negotiations and sign and upload the document granting the buyer's club agent the right to negotiate offers on their behalf (sign for them) and promise to make themselves available for any voting during negotiations.

8. If there are counter offers, buyers vote online on acceptance or rejection with standing offer. If there was a considerable difference between the first offer and asking price, the agent will include a counter offer option on the vote. Buyers enter their counter offer price. The process is continued one more time at most to finalize if property is sold and there is an accepted offer contingent to inspection, appraisal, a clear title and if relevant a marginal loan/mortgage.

9. Buyers receive an e-mail indicating monies needed to be paid to brokerage for upfront costs and those to be deposited in the trust account for purchase. Buyers pay immediate costs within a day and deposit rest in trust account within the time period set for it.

10. Buyers sign (electronically or physically) and submit/ send/deliver any documents required for legal entity formation. They upload the same into the system. They receive notification of legal entity formation by e-mail.

11. They download from a page on website, the inspection, appraisal and broker recommendation on course of action. They review and vote on recommended course of action and indicate if they desire to withdraw. No action will be construed as agreeing to go ahead with the purchase.

12. They receive e-mail on final sale/no sale on after-inspection negotiation. If no sale, legal entity will be dissolved and trust account monies returned. If after inspection vote there are a few withdrawals, waitlisted buyers get an e-mail with request to fill the difference. If enough wait listed members opt in there is a sale.

13. If sale goes through buyers check status online on closing and disbursement of funds.

14. After completion of closing, buyers receive an e-mail indicating the date and time of web conference for governance agreement voting and Property Management contract details.

15. They attend web conference, understand the standard clauses and any additional options for the property type required for the governance agreement and Property Management Contract and go on the website and vote on them.

16. Based on the voting, the system generates the contracts. Buyers sign, scan and upload the contract and send the originals of this and any other previous documents by courier or in person to the Brokerage office. Alternatively they use a recommended electronic signature service to sign off on documents.

17. On final receipt of all signed documents, system will generate a certificate indicating extent of ownership in the formed entity.

Brokerage Agent's Interaction With the System

1. As buyers assign funds to properties, the system dynamically orders them based on time stamps. At the end of the time period set for the showcase event, the system uses a set of rules to resolve simultaneous entries and create assigned buyer lists and wait lists for each property. It sends e-mails to the brokerage agent and each person that assigned funds informing them of status and giving them time to go online and remove themselves from wait lists or reassign/increase funds on properties without adequate assigned funds.

2. After the reassignment round, review the final lists and send reminder e-mails and phone calls to those that have not responded to trigger e-mails on properties with adequate funds.

3. If there are properties with a small enough gap between total assigned funds and those required to move to the next stage, you will receive system e-mails suggesting activation of a mortgage vote. Evaluate them to see if mortgage is indeed a viable option. If so, have assigned buyers vote online on their interest for the same. If there are enough buyers willing to do a mortgage so making an offer is still viable then have buyers approach a mortgage Broker for assessment. When the Mortgage Broker's assessment comes in, add your recommendations and upload it on the website. Have the related buyers vote on moving to offer negotiation. The result of this vote determines if the sale moves to the next stage.

4. Once all assigned buyers on the property have signed and uploaded into the system, paperwork giving you the right to negotiate on their behalf and promised to make themselves available for negotiations, start the negotiations.

5. Start negotiations at the weighted average offer price calculated by the system going up to the lower number between the CMA price and the maximum offer price indicated by any buyer for it. Use the system to communicate offers and have them counter offer.

6. If there is a counter offer beyond that price, send an e-mail to buyers through the system to vote on acceptance, rejection with a standing offer or (if there is a big difference between offer and list price) a counter offer.

7. If most of the buyers opt for a counter offer, use the counter offer price (weighted average) indicated by the system.

8. Go up to a maximum of two rounds of counter offering at the end of which the property is either sold or not. Ensure sale is contingent to inspection and appraisal and depending on situation a marginal loan/mortgage.

9. Create an online bill pay profile for each one of the buyers and inform them by e-mail. They can set up their bank accounts and credit cards on the site and change passwords.

10. Put together schedule of costs based on availability of affiliate suppliers and enter it through the desktop tool. Indicate any title company for deposit of funds in the trust account. Indicate immediate costs on the tool. The system will calculate a separate schedule for each buyer and send them an e-mail with a link to look it up and pay immediate costs.

11. Ensure that immediate costs are collected and start inspection, and appraisal. Also start legal entity formation with brokerage as a marginal member/partner having manager status possessing signing rights. Depending on prevalent rules obtain signatures from buyers if required.

12. Enter status into the system when legal entity is formed to trigger an e-mail informing the same to buyers.

13. Initiate mortgage/loan approval process with mortgage broker, if mortgage is involved.

14. Evaluate resulting reports to assess if deal is viable and recommend course of action. Consult affiliated attorney as necessary. Ensure that all assigned funds are in the trust account and upload reports and recommendations on to the system, set up the vote and have system send e-mails to invite buyers to vote on course of action. Not voting will be considered as agreeing with recommended course of action.

15. Based on vote, withdraw offer or negotiate with listing agent if necessary and then accept and proceed to closing. If offer is being withdrawn for a small no. of people backing out, use the system to try and make up for withdrawals from members on the waiting list. Have attorney attend closing. Mark status online and send e-mails indicating update.

16. Set up a web conference for all buyers to vote on the last stage of the buying process-Governance Agreement finalization and Property Management Contract finalization. Agreements will be drafted based on votes of those attending. Receive RSVPs. Arrange for the affiliate Law firm for the contract generation process to have a representative present.

17. Conduct the web conference. Have law firm representative explain clauses in the standard contracts and any available options. Set up voting for options if necessary and have results entered into a contract generation application in the system. Have generated contracts available for download during or soon after the conference. Require that they be signed, scanned and uploaded and the original couriered or delivered in person to the brokerage. Recommend an electronic signature service if a viable one is available.

18. At the web conference have a securities broker speak about using the exchange for trade in single property securities that they have just acquired.

19. Require originals of all uploaded documents not already sent to the brokerage be couriered or delivered to the brokerage.

20. Assimilate the final Governance (LLC or another entity in a state where LLCs are not recognized) Agreement and Property Management agreement with all signatures, upload a copy and keep original on file.

21. Once all documentation is complete enter certificate generation approval in the system.

Data Transformation Aspect of the System

1. In the "BUY" step, buyer's assigned funds, offer price and priority list for each property they assign funds to, gets converted to part offers contributing to a complete offer for each property that has enough buyers to move to the offer stage.

2. Further in the step, offer negotiations that result in an accepted offer, lead to entity formation and buying of property into the entity with each buyer getting interest in entity in proportion to the money contributed by them towards property purchase resulting in securitization, a certificate of interest in the entity and a list of attributes related to the certificate. So what started as a buyer's criteria for investment property within an assigned geography gets converted to a tradable single property security.

Use Exchange

Buyer Interaction With the System

1. On purchase through the buyer's club, the entity formed is automatically registered with the exchange enabling buyers to trade in their share of the property.

2. Either at the time of joining the buyer's club or after the first purchase buyers will be able to go on their buyer's club account online and register as an individual desiring to trade on the exchange. They can get all information on the website about any fees and procedures involved before they take any action.

3. They will receive a list of security brokers authorized to trade on behalf of buyer's club members on the exchange. They can trade on the exchange as an individual through a registered broker's site or contract with a broker in person to do the trades for them. The issued share certificate will authenticate them to the securities broker and the exchange and activate the security on the exchange for trade.

4. Company entities of the properties their securities are related to, will not be constantly traded on the exchange. They will be traded initially to eliminate mortgage and then only when they or any other owner wishes to liquidate partially or entirely the securities they own either by listing or responding to a bid.

5. If initially the entity that they hold the security for is in "Low Leverage Status" where each security holder has share of mortgage in relative proportion to cash contributed to the property included in his/her share of entity, equivalent shares to the extent of mortgage will be listed under the entity's name. Proceeds of each sale are applied to mortgage and each security holder's share of entity interest containing their share of mortgage is re-calculated and share equivalent to remaining mortgage continues to be listed. This continues till all mortgage is eliminated.

6. They need to follow any or all rules set by the exchange for trading, including those for trading in an up market or for trading in a down market, all of which will be available to them on the exchange website and their securities broker's website. The exchange will set the values and limits to how much trade values can differ from set value on a regular basis. Exchange maintains a current independently certified video tour and condition report of the property in addition to a complete profile.

7. When they want to list a part of their share for sale, they do so on the exchange either by themselves on one of the securities broker's websites or through a securities broker directly on the exchange. They will give all details, including but not limited to, % share that they want to sell, details of the showing real estate agent for buyers wanting to see the property in person, any minimum offer size they wish to set, and any conditions on their LLC or corporation agreement that needs to be met by the buyer.

The payment accounts set up during collective purchase on the system are used to receive payments to complete sale.

8. When they wish to buy a listed share, they either buy it themselves on the site of a registered broker or authorize a broker to do so. They make an offer, indicating compliance with any set conditions. They will set up a payment account on the securities broker's website. On intimation of acceptance of the offer they will make the payment on the website. If the offer is presented directly by their contracted securities broker the payment mode will be decided between the two of them and their broker will do the trade.

9. When they wish to buy shares of an entity registered with the exchange but there are no shares listed, they can post an open bid on the system at exchange value or greater or lesser within exchange set limits, for the % share they want. Again, they do it either by themselves on a securities broker website or have a securities broker put it in for them.

10. They and all members of their company will receive an e-mail generated by the exchange system when someone posts an offer to buy shares of their company. They send their acceptance to the exchange immediately if they wish to sell their share. The exchange system will remit the acceptance to the buyer on a first come first served basis. Again, they do this either by themselves on a securities broker website or have a securities broker put it in for them. The payment accounts set up during collective purchase on the system are used to make payments to complete sale.

11. The exchange website will be a useful source of information for buyer's club members with several reports and analyzes and valuations of all its registered trading entities. It will also have a link to the rental marketplace with available rentals for the exchange traded properties. The exchange website will also have a link to an Ideation website where improvement/capital projects for existing exchange properties and new construction projects on land listed on the exchange are posted. Buyers can vote on project options, give opinions etc. All approved new construction or capital improvement projects get added to the listing database of the Buyer's Club Brokerage and listed on any reciprocal Real Estate Professionals Listing Website. With Property Manager as Listing Broker Brokerage Agent's Interaction With the System 1. Make Buyers joining the club aware of the fact that they can go online and register for exchange services to buy and sell single property securities (interest in companies holding managed single properties) directly after a set minimum number of purchases through the club and that they need to associate themselves with a securities broker to be able to do so.

2. After a purchase has been made through the buyer's club converting an owned property into a single property security, agent has to ensure that all information necessary is input into the system. There will be three designations of operation that will be set at the Governance Agreement signing—Maximize Profit (most income properties), Low Profit (e.g. low income housing), Loss (e.g. Land). These designations can later be changed by the Property Manager based on actual operation. Also the agent needs to ensure that the leverage level is entered. If there is a mortgage then it is entered as "Low Leverage" and if there is no mortgage then "Derivative Ready".

Securities Broker—Interaction With the System

1. Securities Brokers register themselves with the Exchange as authorized to represent Buyer's Club Members for trades on the exchange. They create their profiles on the exchange website.

2. They can get a special registration giving online access to buyer's club members through their website to trade on the exchange directly.

3. Each legally authorized agent in a securities broker's office can then register themselves individually with the exchange. They will have a login to the Exchange database and will be able to send messages to exchange office and enter listings, buy listed securities and enter open bids.

4. They can register themselves as a buyer's club member in addition to being registered as a securities broker to trade for themselves.

5. They will be able to create funds and other financial derivatives but will have to market them to buyer's club members and have them listed on the exchange.

Exchange Employee—Interaction With the System

1. You will monitor data feeds from the buyer's club into the exchange system on a regular basis and ensure that they accurately reflect the club's securitization activities, 2. You will ensure all registered entities are current on their dues and the system accurately reflects it and sends reminder e-mails to ensure it.

3. You will ensure that all information necessary for valuation is posted into the system on a periodic basis and get the information and post it if not so system accurately reflects values at all times 4. You will confer with Property Manager on a regular basis to ensure all objectives are being achieved and post financial information for each entity.

5. You will ensure that Independently certified video tours and property condition reports are posted on to the system and are regularly updated 6. You will ensure that the system is up and running 24/7.

Property Manager—Interaction With the System

1. You register yourself as a preferred Property Manager with the Exchange and create a web page on the exchange system.

2. You sign and upload an agreement to abide by the standards of Property Management set by the exchange for the different property classes 3. When assigned to an entity, the system sends all security holders a link to your web page.

4. Send them an e-mail introducing yourself and a link to your property management site.

5. Assign an accountant to the property for periodic reports to be submitted to the exchange.

6. Determine, if assigned designation is achievable and is the best designation for the property. Change if necessary.

7. If property has a mortgage on it, put the shares up for sale on the exchange, until mortgage is paid off through trade on exchange and/or income.

8. If property is land, keep track of developments in the property location to determine the right time for development and the most profitable form of development. When the time is right, have developers present project concepts and post these concepts for vote on Ideation website of the exchange for buyer members to vote on the concepts. Based on vote results and knowledge of market, decide on the project/s to put on sale. List on MLS as land with project packet. Activate project on Ideation website for transfer to Buyer's Club Brokerage database. On activation the project gets transferred to the Buyer's Club Brokerage automatically overnight. Inform current entity security holders of impending sale of land with project. Inform them of showcase event dates so they can re-bid for the project if they wish to continue to be security holders. When project gets sold and re-registered on the exchange, co-ordinate with developer until construction is complete, property is assigned to new property class and new designation. Prepare new objectives for the entity and submit to exchange. Keep track of values and manage property according to standards set for the class.

9. If property needs major capital improvements, get bids for capital improvement projects, decide on vendor and put the project on the ideation website for feedback. Use feedback to decide the right time to list and list on the MLS as the said property class with an improvement project packet. Activate project on Ideation website for transfer to Buyer's Club Brokerage database. On activation the project gets transferred to the Buyer's Club Brokerage automatically overnight. Inform current security holders about showcase events so they can bid on it for continuing as security holders. Manage the transition, reclassify property if necessary, co-ordinate the improvements. Change all necessary details on the exchange website.

10. Post all rental activity on the public rental website of the exchange. Keep track of market rents and amenities in property location and adjust rents on the site as necessary.

11. Post all information required by the exchange for the property in a timely manner and confer with exchange employees on valuations, objectives and classifications for the property entity.

Data Transformation Aspect of the System

1. The entity formed in the "BUY" step gets registered automatically on the exchange system through a database process. All issued certificate details get copied as well. Each buyer's share can be put up for sale or be sold entirely or in part on a bid or on an offer on the exchange resulting in newly issued certificates which can then be traded and so on and so forth. So the securities formed in the "BUY" step get traded in the "USE EXCHANGE" step and continually create new securities data elements with new values.

The invention claimed is:

1. A computerized method of a real estate brokerage entity, performed using a network that is linked to the Internet, wherein said network constitutes a plurality of computers linked via a non transitory computer readable medium for creating and subsequently trading over a linked private securities exchange, one or more real estate securities, the method comprising:

soliciting using said network, by said real estate brokerage entity a first plurality of internet users who are its prospective members solicited for representing them in at least one collective purchase transaction where each said transaction results in securitization of one real estate investment property, said soliciting using at least a website of said real estate brokerage entity wherein said website is disposed on a first computer of said network, said first computer being one of the computers of said network is configured to perform the computerized real estate brokerage entity functions of the method;

responsive to said soliciting, receiving from a second plurality of internet users over said website at a plurality of requests for registering as a prospective member and generating, by said first computer, a first data repository wherein said first data repository comprises user registration information of each one of the second plurality of registering users that includes at least a respective member investment criteria, name, an email address, and a membership agreement with the entity and said member investment criteria further comprise at least one or more property types of interest and at least one location of interest;

forming one or more member groups, by said first computer on the basis of one or more geographies of each one of said second plurality of registering users wherein a geography comprises any combination of a portion of said member investment criteria and a portion of said registration information selected from the first data repository, the real estate brokerage entity, and wherein each member group comprises a plurality of members from said first data repository;

generating, by said first computer, a second data repository comprising data associated with a plurality of real estate investment properties for sale wherein said generating is based on data received by said first computer over network that is linked to the Internet with one or more sources of listed real estate properties for sale, wherein said data on a plurality of real estate investment properties comprises for each real estate investment property at least, a description of the property, a sale price, identity of a seller, identity of the seller's agent and a contact information for the seller's agent, wherein seller's agent constitutes one of a licensed fiduciary associated with the seller and the seller;

generating, by said first computer, a list of one or more real estate investment properties from second data repository for each of one or more member groups of members from first data repository, wherein said list is generated on the basis of data comprising said member investment criteria from first data repository for the members of associated one member group and details of real estate investment properties purchased in any previous collective purchase transactions by the members of associated member group;

showing via, at least said website of said real estate brokerage entity using said network of computers that is linked to the Internet, one or more real estate investment properties from said generated list of real estate investment properties, to the members in the member group associated with said generated list, said showing done over a specified period of time set up by the real estate brokerage entity on said first computer wherein electronic showing includes display of all relevant details of each of the one or more real estate investment properties from said second data repository details comprising in the least sale price for each said property for the purpose of facilitating the collective purchase transaction involving each said property;

receiving via said real estate brokerage entity's website in response to said showing of real estate investment properties to members of said associated member group within a second specified period of time set by the brokerage agent of the entity and subsequently storing into a third data repository one or more fund assignments, wherein each of the received one or more fund assignments represents the intended contribution of the respective member towards the collective purchase transaction involving one property from generated list of real estate investment properties actually shown to member group to which member making the fund assignment belongs;

receiving, at said real estate brokerage entity's website with each fund assignment, into third data repository via said first computer from said member associated with the fund assignment, offer price towards the collective purchase transaction involving the associated real estate investment property;

generating, by said first computer, for one or more real estate investment properties from said the generated list of real estate investment properties that were shown to members of said member group and received fund assignments, from received fund assignments associated with the real estate investment property and received offer prices associated with fund assignments, a list of at least one potential group of buyers comprising members from the associated member group, group offer price for each group towards the collective purchase transaction involving said real estate investment property and a list of waitlisted members for the real estate investment property wherein the list of waitlisted members is generated only when one or more members with funds assigned to real estate investment property agree to be waitlisted for it for the purpose of replacing any members from at least one potential group of buyers that may withdraw in future steps, while the list of at least one potential group of buyers is generated on the basis of the time of fund assignments and said group offer price associated with each potential group of buyers on said list is generated on the basis of offer prices associated with said fund assignments of members of respective potential group of buyers;

negotiating by said real estate brokerage entity, a purchase price for one said real estate investment property having generated list of at least one potential group of buyers with the seller's agent of the real estate investment property wherein said negotiating is performed via said website of the real estate brokerage entity comprising using web based collaboration tools for achieving any group decisions to enable negotiating on behalf of the associated potential group of buyers, wherein negotiated purchase price resulting from the negotiation is recorded on a fourth data repository linked to said first computer and wherein said negotiating further comprises:

communicating the group offer price to the seller's agent of said real estate investment property, receiving from the seller's agent of said real estate investment property in response to group offer price one of: a seller counter offer and a seller acceptance of said group offer price converting the said group offer price into as the purchase price for said real estate investment property, communicating to the seller's agent of said real estate investment property in response to any seller counter offer one of, a group counter offer and a group acceptance of said seller counter offer as the purchase price for said real estate investment property, receiving from the seller's agent of said real estate investment property in response to any group counter offer a seller acceptance of said group counter offer as the purchase price for said real estate investment property;

coordinating via the Internet, by said real estate brokerage entity via its website, completion of the collective purchase transaction for each real estate investment property from said generated list of real estate investment properties having a respective negotiated purchase price, wherein recording of said completion of the collective purchase transaction is performed by storing relevant purchase transaction data in said fourth data repository on said first computer while said collective purchase transaction comprises a purchase of said real estate investment property by a legal entity holding its title where said legal entity is partly owned by each of the members of said group from said list of at least one potential group of buyers having the negotiated purchase price associated with said real estate investment property, in proportion to funds contributed by said member towards its purchase said part ownership in the legal entity being recorded in said fourth data repository as a security, said member having said part ownership being recorded as a security holder, and said real estate investment property purchased by the legal entity being recorded as a securitized property, whereby said recorded coordinating enabled at least in part by the use of web based collaboration tools further comprises:

coordinating legal entity formation by the members of said group from the associated list of at least one potential group of buyers, coordinating collection of funds from the members of said group from the associated list of at least one potential group of buyers, coordinating replacement of withdrawing members from said group from the list of at least one potential group of buyers with members from the associated list of waitlisted members for the purchase of said real estate investment property, coordinating a closing to complete said purchase by said legal entity, coordinating generation of documents for said purchase transaction and related to said legal entity;

facilitating property management of each said securitized property after its securitization, by a second computer, wherein said second computer is linked to the first computer via a network dedicated for performing computerized exchange functions of the method, wherein said facilitating comprises:

recording of via said facilitating, in a fifth data repository on said second computer, residing wherein the facilitating comprises, at least specifying property management information to be entered by an agent of said linked private securities exchange comprising an exchange employee for achieving uniform property conditions and thereby uniform valuations based on said property conditions of similar securitized properties;

conducting electronic trade of said real estate security, by said second computer recorded on a sixth data repository wherein said real estate security comprises said security representing part ownership of said legal entity holding title to the associated managed securitized property between the security holder and at least one other trading member of said linked private securities exchange, wherein a trading member is one member of said linked real estate brokerage entity who is recorded on the sixth data repository as qualified to trade on said securities exchange based on having at least one collective purchase transaction in the fourth data repository prior to trading, whereby trade activities relating to said real estate security conducted over said network linked to the Internet, for said security holder who is represented for the trade on said second computer by a securities fiduciary authorized by said private securities exchange, wherein said conducting comprises:

listing for said security holder said real estate security at least in part, for sale on value, communicating to said security holder any offer to purchase the real estate security listed for sale wherein the offer forms at least a part of the listed real estate security, communicating to the trading member any acceptance by the security holder of the trading member's offer to purchase the listed real estate security at least in part, communicating to the security holder any bid to purchase at least a part of the real estate security owned by the security holder; and communicating to respective trading member any acceptance by the security holder of the trading member's bid to purchase at least a part of the real estate security owned by said security holder.

2. The method of claim 1 wherein said generating of said first data repository in response to said soliciting further comprises restricting by said first computer one member from accessing another member's data from said first data repository.

3. The method of claim 1 wherein said registration information of each registering member responding over said website of the real estate brokerage entity recorded on first data repository on said first computer of said network of computers linked to the Internet further comprises:

electronically entered agreement from said member on use of legally obtained cash for collective purchase transactions;

electronically entered acceptance from said member on electronically viewing one of the live streaming video tour and an independently certified video tour of the real estate investment property before assigning funds towards the collective purchase transaction involving said real estate investment property while considering the electronic viewing as equivalent to physically viewing the property;

electronically entered acceptance from said member on viewing the independently certified video tour of the real estate investment property associated with a trade transaction on the linked private electronic securities exchange;

electronically entered acceptance from said member of only applying funds actually available to the member when assigning funds towards any collective purchase transaction;

electronically entered acceptance from said member of making at least one collective purchase transaction involving at least one real estate investment property before trading on the linked private electronic securities exchange;

electronically entered acknowledgement from said member at the time of starting membership that the member does not represent a real estate related entity comprising one that does property management as well as one that holds property for non-residential investment wherein the term real estate related entity here includes the member as a self-employed individual; and electronically entered agreement from said member on allowing the real estate brokerage to represent the member in negotiations of collective purchase transactions.

4. The method of claim 1 system wherein said generating, by said first computer, a list of one or more real estate investment properties from said second data repository, for one said member group of members from said first data repository further comprises:

automatically determining, by said brokerage first computer in response to one of receiving of new member investment criteria into said first data repository for one or more members of said one member group and passing of a pre-set time interval for such determining set by said real estate brokerage entity on said first computer for said member group, one or more sets of investment criteria characteristic of said member group wherein each said set of investment criteria is a combination of one or more member investment criteria that appears with high frequency within said member group whereby high is a threshold determined by said first computer based on the level of frequencies present in the data accumulated in the first data repository;

automatically developing in response to the determination of investment criteria sets characteristic of said one member group, an initial list of one or more real estate investment properties from said second data repository, based on the real estate investment properties currently for sale having said investment criteria sets in their details accumulated in the second data repository;

automatically developing by said first computer, a statistical model for said member group based on past collective purchase transactions of each member of said member group wherein said statistical model is developed only when sufficient quantity of data is available of said collective purchase transactions for determining the real estate investment property details that can statistically predict if a real estate investment property is likely to be purchased by a sub-group of members of said member group, said developing done for the purpose of predicting the same for properties in said initial list of real estate investment properties;

automatically determining, by said first computer based on applying the developed statistical model when it exists, to each real estate investment property in said initial list of one or more real estate investment properties to determine a predicted list of one or more real estate investment properties from said initial list likely to be bought by a subgroup of members of said member group associated with said initial list of properties;

automatically finalizing one of, the initial list of real estate investment properties in the absence of said statistical model and the predicted list of real estate investment properties, as the generated list of real estate investment properties to show the members of said member group associated with said list.

5. The method of claim 1 system wherein said electronic showing over said network linked to the Internet of the one or more properties from one said generated list of real estate investment properties further comprises streaming live over said real estate brokerage entity's website the video tour of each of the one or more properties.

6. The method of claim 1 system wherein said generating by the first computer of said list of at least one potential group of buyers, their group offer price and any said list of waitlisted members for one property from said generated list of real estate investment properties that has associated fund assignments, generated from said fund assignments of members of said associated member group and said offer prices associated with the fund assignments, further comprises generating said group offer price as a weighted average of offer prices of the members of said potential group of buyers who are those members from said associated member group whose cumulatively added fund assignments, ordered by time of assigning funds is sufficient to buy the property while the weight applied to the offer price of one member of said potential group of buyers is that indicated by the relative proportion of the fund assignment of that member to said cumulatively added fund assignments of all members of the potential group of buyers.

7. The method of claim 1 wherein said generating by the first computer of said list of at least one potential group of buyers the group offer price of each group and said list of waitlisted members for one real estate investment property from said generated list of real estate investment properties that has associated fund assignments, generated from said fund assignments of members of said associated member group and said offer prices associated with the fund assignments, further comprises a second round of assignment of funds over a third specified period of time set by said first computer for the purpose of accumulating enough fund assignments to buy said property when the previous round is unable to do so wherein said group offer price is the weighted average of offer prices of the members of said potential group of buyers who are those members from said associated member group whose cumulatively added fund assignments after said second round of fund assignments for said one real estate investment property, ordered by time of assigning funds is sufficient to buy the real estate investment property wherein the weight used for one member from the said potential group of buyers is indicated by the relative proportion of the fund assignment of the respective member to said cumulatively added fund assignments of all members of the potential group of buyers funds.

8. The method of claim 7 wherein said generating by the first computer of said list of at least one potential group of buyers, their group offer price and any said list of waitlisted members for one real estate investment property from said generated list of real estate investment properties that has associated fund assignments labeled list of funded properties, generated from said fund assignments of members of said associated member group and said offer prices associated with the fund assignments, further comprises receiving a mortgage approval for said potential group of buyers for a mortgage amount enough to cover deficiencies in funds needed to make an offer for said property after said second round of assignments is unable to do so, whereby said generated group offer price is a weighted average of offer prices of the members of said potential group of buyers from said associated member group with fund assignments for said real estate investment property, while the weight used for each member from said potential group of buyers is that indicated by the relative proportion of the fund assignment of that member to the sum of fund assignments of all its members.

9. The method of claim 1 wherein said recorded coordinating, of generation of documents by said first computer related to said legal entity holding title to said real estate investment property from said generated list of real estate investment properties for the members of said associated potential group of buyers that are each its part owners, whereby this coordinating forming part of said coordinating of the collective purchase transaction involving said real estate investment property having said negotiated purchase price further comprises coordinating the generation of a governance document of the said legal entity having a plurality of standard clauses included by said first computer during generation, said standard clauses comprising:
  making each said security represented by partial ownership in said legal entity tradable on value at least in part, at most as a whole on the said linked private electronic securities exchange;
    prohibiting guaranteed residence rights in said real estate investment property to any security holder of the property for any length of time;
  prohibiting any direct interest in the title associated with said real estate investment property to any said security holder of the property;
  permitting said legal entity to hold only one real estate investment property, the one that it was created for; and
    prohibiting said legal entity from carrying on any business other than that comprising holding, maintaining and generating income from the associated real estate investment property.

10. The method of claim 1 wherein said coordinating of generation of recorded documents by said first computer related to the legal entity holding title to said real estate investment property from said generated list of real estate investment properties, for said members that are each its part owners the part ownership recorded in said fourth data repository as said security while the part owners being recorded as security holders, said coordinating forming part of the coordinating of the completion of said collective purchase transaction involving said real estate investment property having said negotiated purchase price further comprises coordinating the generation of an electronic share certificate document by said first computer for each said recorded security related to said legal entity, said electronic share certificate document in the least specifying all relevant details regarding said security for performing that certifying functions comprising:
  certifying the identity of the legal entity said security represents;
  certifying the identity of the security holder of said security;
  certifying the security holder's share of interest in said legal entity;
  certifying that said security represents interest in only one real estate investment property;
  certifying the identity of said real estate investment property associated with the security;
  certifying that the legal entity said security represents a share of, does not do any business other than that comprising holding, managing and generating income from the real estate investment property associated with it;
  certifying that said security holder does not have any guaranteed residence rights in said associated real estate investment property;
  certifying that said security is tradable on value even in part;
  certifying that said security cannot trade on any exchange other than the one it is authorized for;
  certifying that the initial security holder of said security was selected for acquiring the security through automated method of bidding without any human matching involved;
  certifying that said security is a demand generated security wherein the demand generated security is initially generated by buyer initiation indicating the desirability of the associated securitized property to its buyers consequently not being initially generated by seller initiation like in a public issue.

11. The method of claim 9 wherein coordinating said generation of the governance document of said legal entity further comprises coordinating web conferencing of the part owners of said legal entity via the real estate brokerage entity's website by the said real estate brokerage entity while said coordinating, during said web conferencing further includes, conducting of a live web voting by said part owners of said legal entity for the purpose of deciding all non-standard clauses of said governance document.

12. The method of claim 1 wherein said facilitating of property management of said securitized property after completion of its purchase by said legal entity over said network linked to the Internet further comprises the computerized functions of:
  assigning and recording, by the real estate brokerage entity based on accessing a list of registered property managers stored on said fifth data repository as part of said entered property management information, one registered property manger as a property manager of said securitized property for the purpose of overseeing the management of the securitized property for the associated legal entity as per said linked private securities exchange requirements wherein the recording further populates said fifth data repository;

monitoring, by said second computer on behalf of the linked private securities exchange of an operation designation from said property management information regarding profit achieved by operation of said securitized property entered by said agent of said linked private securities exchange comprising said property manager of said securitized entity over said network that is linked to the Internet, recording of said monitoring further populating said fifth data repository wherein said operation designation comprises one of maximize profit, low to no profit and loss;

monitoring, by said second computer on behalf of the linked private securities exchange, a property class for the securitized property from said property management information entered over said network linked to the Internet, by said agent of said linked private securities exchange comprising said property manager of said securitized property regarding said property class, recording of said monitoring further populating said fifth data repository wherein said property class is the classification of similar securitized properties classified for of achieving said uniform valuations within the property class;

monitoring by said second computer managing of said securitized property as per a plurality of managing standards, on behalf of the linked private securities exchange from said property management information entered over said network linked to the Internet, by said agent of said linked private securities exchange comprising said property manager of said securitized property, recording of said monitoring further populating said into the said fifth data repository wherein said managing standards are set for the purpose of achieving said property class associated with the securitized property.

13. The method of claim 1 wherein said conducting of electronic trade of said real estate security, recorded on said sixth data repository further comprises generating by said second computer a value with limits, for said real estate security for the purpose of establishing by the generated value a beginning asking price of said real estate security while the limits control how much the traded sale price of the real estate security may vary from said generated value.

14. The method of claim 1 wherein said received offer price, received over said real estate entity's website with said associated fund assignment towards the collective purchase transaction involving said one property from said generated list of real estate investment funded properties, recorded by said third data repository on said first computer, received from said member associated with the fund assignment, further comprises the member's desired offer price for the entire property.

15. The method of claim 1 wherein said conducting of electronic trade recorded by said sixth data repository of said security, representing part ownership in said legal entity holding title to the associated managed securitized property, further comprises mandatory elimination by said second computer of any mortgage associated with said security via the application of proceeds of each trade towards said mortgage elimination until all mortgage associated with the securitized property represented by the security is first eliminated.

16. The method of claim 1 wherein said facilitating property management of each said securitized property after its securitization, by said second computer recorded on said fifth data repository completion of its purchase by the said legal entity further comprises:
  providing an ideation section on said real estate brokerage entity's website which is linked to a website of said linked private securities exchange, to the entity holding title to said securitized property appointed registered property manager for the purpose of posting one or more project ideas for said securitized property wherein each project idea pertains to one of a capital improvement project for said securitized property or a new construction project on said securitized property;
  requesting, by the second computer, of members of said real estate brokerage entity to express their level of interest in said posted project ideas posted on said ideation section of the website;
  communicating to said legal entity, by said second computer, results of member response for said posted projects posted on said ideation section for the purpose of facilitating the gauging of demand for collective investment, in said one or more posted project ideas for said securitized property.

* * * * *

UNITED STATES PATENT AND TRADEMARK OFFICE
CERTIFICATE OF CORRECTION

Page 1 of 2

PATENT NO. : 8,392,318 B2
APPLICATION NO. : 12/983862
DATED : March 5, 2013
INVENTOR(S) : Bee It is certified that error appears in the above-identified patent and that said Letters Patent is hereby corrected as shown below:

On the title page item [12], "Bhat" should read as follows:

Bee

On the title page item [76] which currently reads as "Inventor: Asha Subraya Bhat, Northridge, CA" should read as follows:

Inventor: Ashley Sarah Bee, Los Angeles, CA

In the Claims

Column 24, line 7, claim 1, should read as follows:

repository, by the real estate brokerage entity, and wherein

Column 25, line 2, claim 1, should read as follows:

estate investment properties from the generated list

Column 25, line 42, claim 1, which reads "converting said group offer price into" should read as follows:

offer price as

Signed and Sealed this
Twenty-eighth Day of January, 2014

Michelle K. Lee
*Deputy Director of the United States Patent and Trademark Office*

CERTIFICATE OF CORRECTION (continued)
U.S. Pat. No. 8,392,318 B2

Column 27, line 54, claim 4, should read as follows:

4. The method of claim 1 wherein said generating,

Column 28, line 39, claim 5, should read as follows:

5. The method of claim 1 wherein said electronic

Column 28, line 45, claim 6, should read as follows:

6. The method of claim 1 wherein said generating

Column 30, line 20, claim 10, should read as follows:

rity for performing certifying functions comprising:

Column 32, line 30, claim 16, should read as follows:

title to said securitized property

Column 32, line 31, claim 16, should read as follows:

for the purpose of posting one or more